United States Patent
Anders et al.

(10) Patent No.: US 10,798,091 B2
(45) Date of Patent: *Oct. 6, 2020

(54) MULTI-STEP AUTHENTICATION USING OBJECTIVE AND SUBJECTIVE CREDENTIALS

(71) Applicant: International Business Machines Corporation, Armonk, NY (US)

(72) Inventors: Kelley Anders, East New Market, MD (US); Jonathan Dunne, Dungarvan (IE); Robert Grant, Austin, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/844,897

(22) Filed: Dec. 18, 2017

(65) Prior Publication Data

US 2019/0124068 A1    Apr. 25, 2019

Related U.S. Application Data

(63) Continuation of application No. 15/792,961, filed on Oct. 25, 2017.

(51) Int. Cl.
*H04L 29/06* (2006.01)
*H04L 9/32* (2006.01)

(52) U.S. Cl.
CPC .......... *H04L 63/083* (2013.01); *H04L 9/3226* (2013.01); *H04L 9/3271* (2013.01); *H04L 2463/082* (2013.01)

(58) Field of Classification Search
CPC ... H04L 63/083; H04L 9/3226; H04L 9/3271; H04L 2463/082
See application file for complete search history.

(56) References Cited

U.S. PATENT DOCUMENTS

| | | | |
|---|---|---|---|
| 7,873,995 B2 | 1/2011 | Bagga et al. |
| 8,099,770 B2 | 1/2012 | Makkinejad |
| 8,914,642 B2 | 12/2014 | Hayashi |

(Continued)

OTHER PUBLICATIONS

U.S. Appl. No. 15/792,961, filed Oct. 25, 2017.

*Primary Examiner* — Eleni A Shiferaw
*Assistant Examiner* — Bassam A Noaman
(74) *Attorney, Agent, or Firm* — Schmeiser, Olsen & Watts; Michael P. O'Keefe (57) ABSTRACT

Multi-step user authentication combines steps of authenticating both objective and subjective credentials. A user selects objective credentials, such as a password, and enters subjective credentials, such as a subjective description of the user's emotional response to a subjective challenge, such as a musical recording or image. The system identifies other content likely to elicit a similar emotional response from the same user. When the user later attempts to log onto a secured system, the user must enter the objective credentials and then describe the user's emotional response to a second subjective challenge that is likely to elicit an emotional response similar to that invoked by the first subjective challenge. If the user enters the correct objective credentials and describes an emotional response consistent with the first subjective description, then the user is given access to the secured system.

6 Claims, 5 Drawing Sheets (56) References Cited

U.S. PATENT DOCUMENTS

| | | | |
|---|---|---|---|
| 9,223,959 B2* | 12/2015 | Hosabettu | G06F 21/46 |
| 9,495,525 B2 | 11/2016 | Grigg et al. | |
| 9,953,231 B1* | 4/2018 | Medina, III | G06F 21/32 |
| 2015/0319153 A1* | 11/2015 | Tartz | H04L 63/08 |
| | | | 726/4 |
| 2017/0102765 A1* | 4/2017 | Yoneda | G06F 3/011 |
| 2017/0223017 A1* | 8/2017 | Kohli | G06Q 20/40145 |

* cited by examiner

MULTI-STEP AUTHENTICATION USING OBJECTIVE AND SUBJECTIVE CREDENTIALS

This application is a continuation application claiming priority to Ser. No. 15/792,961, filed Oct. 25, 2017.

BACKGROUND

The present invention relates to the authentication of software users who request access to a secured application or system and, in particular, to multi-step authentication procedures that require the validation of multiple sets of credentials.

Conventional one-step password-based user-authentication can be circumvented if a malicious party identifies a user's secret password. Such identification may be accomplished by numerous means, including brute-force guessing, stealing a user's password from a protected electronic storage area or from a hardcopy record, surreptitiously installing keylogging malware onto a user's log-in device, or using a phishing exploit to trick a user into revealing a password.

Two-step authentication methods are more difficult to circumvent. Such mechanisms, after verifying that a user has entered a correct password, require the user to perform an additional authentication step. Such an additional step may, for example, comprise identifying a previously selected photograph, looking into or placing a finger on a biometric scanner, correctly typing an alphanumeric string displayed to the user in a distorted, non-textual graphical form, or choosing items that exhibit a certain semantic characteristic (such as by clicking displayed images that show automobiles).

Regardless of how many authentication steps an authentication mechanism may comprise, mechanisms that verify only "objective" credentials, which must be verified by correctly entering a predetermined "correct" response, are inherently vulnerable. Therefore, although more secure than one-step password-based authentication, multi-step authentication mechanisms that require a user to authenticate only objective credentials may still be cracked. For example, a malicious party capable of stealing a stored password may also be able to access stored non-textual credentials and the correct user responses associated with the non-textual credentials. OCR or artificial-intelligence technology may be able to interactively identify an alphanumeric string displayed as a distorted graphic. And aware image-recognition technology may be capable of inferring semantic characteristics of an image almost as accurately as a human user.

SUMMARY

One embodiment of the present invention s a user-authentication system that includes a processor, memory, and a hardware storage device that contains software to implement a method for multi-step authentication using objective and subjective credentials. A user sets up a log-in procedure by selecting an objective log-in credential, such as a password, and a subjective challenge, such as an audio recording or a video clip. The system then plays the subjective challenge and the user responds with a subjective description of the emotional state that the subjective challenge invokes in the user. The user may then attempt to log onto the system by submitting the objective credential and, when the system responds by playing either the original subjective challenge or a similar challenge, the user returns a second subjective description of how the challenge makes the user feel. If the system determines that the second description is consistent with the original subjective description, the user is granted access.

Another embodiment of the present invention a method for multi-step authentication using objective and subjective credentials. A user sets up a log-in procedure by submitting to a user-authentication system an objective log-in credential, such as a password, and a subjective challenge, such as an audio recording or a video clip. The system then plays the subjective challenge and the user responds with a subjective description of the emotional state that the subjective challenge invokes in the user. The user may then attempt to log onto the system by submitting the objective credential and, when the system responds by playing either the original subjective challenge or a similar challenge, the user returns a second subjective description of how the challenge makes the user feel. If the system determines that the second description is consistent with the original subjective description, the user is granted access.

Yet another embodiment of the present invention is a computer program product that includes software stored on a computer-readable storage medium capable of being run by a computerized user-authentication system to perform a method for multi-step authentication using objective and subjective credentials. A user sets up a log-in procedure by submitting to the user-authentication system an objective log-in credential, such as a password, and a subjective challenge, such as an audio recording or a video clip. The system then plays the subjective challenge and the user responds with a subjective description of the emotional state that the subjective challenge invokes in the user. The user may then attempt to log onto the system by submitting the objective credential and, when the system responds by playing either the original subjective challenge or a similar challenge, the user returns a second subjective description of how the challenge makes the user feel. If the system determines that the second description is consistent with the original subjective description, the user is granted access.

DETAILED DESCRIPTION

Embodiments of the present invention recite a technical improvement upon known two-step authentication technology by requiring a user to enter credentials that are a function of the user's subjective response to a system challenge. Unlike an objective validation procedure, which requires a user to enter specific, previously stored input, a "subjective" challenge does not merely look up a stored "correct" response and attempt to match that correct response to user input. Instead, a subjective validation procedure asks a user to make a subjective judgment about a challenge and then determines whether the user's resulting response is consistent with that same user's previous subjective judgments.

Such embodiments improve the security of known authentication technology because they do not rely solely upon entry of previously stored secret data. As known in the field, any security mechanism that relies upon maintaining the secrecy of an element of stored information, regardless of the sophistication of an encryption algorithm or other method of preserving that secrecy, is inherently vulnerable. This is true whether that secret element is a password, an encryption key, a semantic meaning of an image, a numeric representation of a human fingerprint or retinal scan, a gestural pattern, or an alphanumeric string represented by a distorted graphic.

The present invention's subjective validation procedure, on the other hand, does not need to store a secret, but potentially discoverable, "correct" response to a subjective challenge. Instead, it employs an inferential method that determines a likelihood that a particular user's subjective response is consistent with that user's previous subjective responses. Because such inferences are performed interactively, and are based on behavior specific to a particular user rather than on a simple method of matching a user response to stored data, such embodiments do not suffer from vulnerabilities that arise from the need to maintain the secrecy of stored objective credentials.

Embodiments and examples described in this document are limited for pedagogical purposes to methods of two-step authentication, in which a first step comprises objective authentication of objective credentials and a second step comprises subjective authentication of subjective credentials. These embodiments and examples should not be construed to limit embodiments of the present in invention to two authentications steps, nor to embodiments in which one or more objective authentication steps precede one or more subjective authentication steps. The present invention is flexible enough to accommodate authentication methods that comprise an arbitrary number of objective and subjective authentication procedures in any order.

Similarly, embodiments and examples presented here that describe subjective challenges comprising musical passages, photographs, or other types of subjective challenges should not be construed to limit the present invention to subjective credentials that consist of similar content. Embodiments may comprise subjective authentication steps that may require users to provide subjective responses to any class of content, such as non-musical sounds, animations, smells, generalized graphical images, charts, statistical analyses, new items, graphical layouts, spoken word, video content, smells, or tactile, force-feedback, or haptic content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
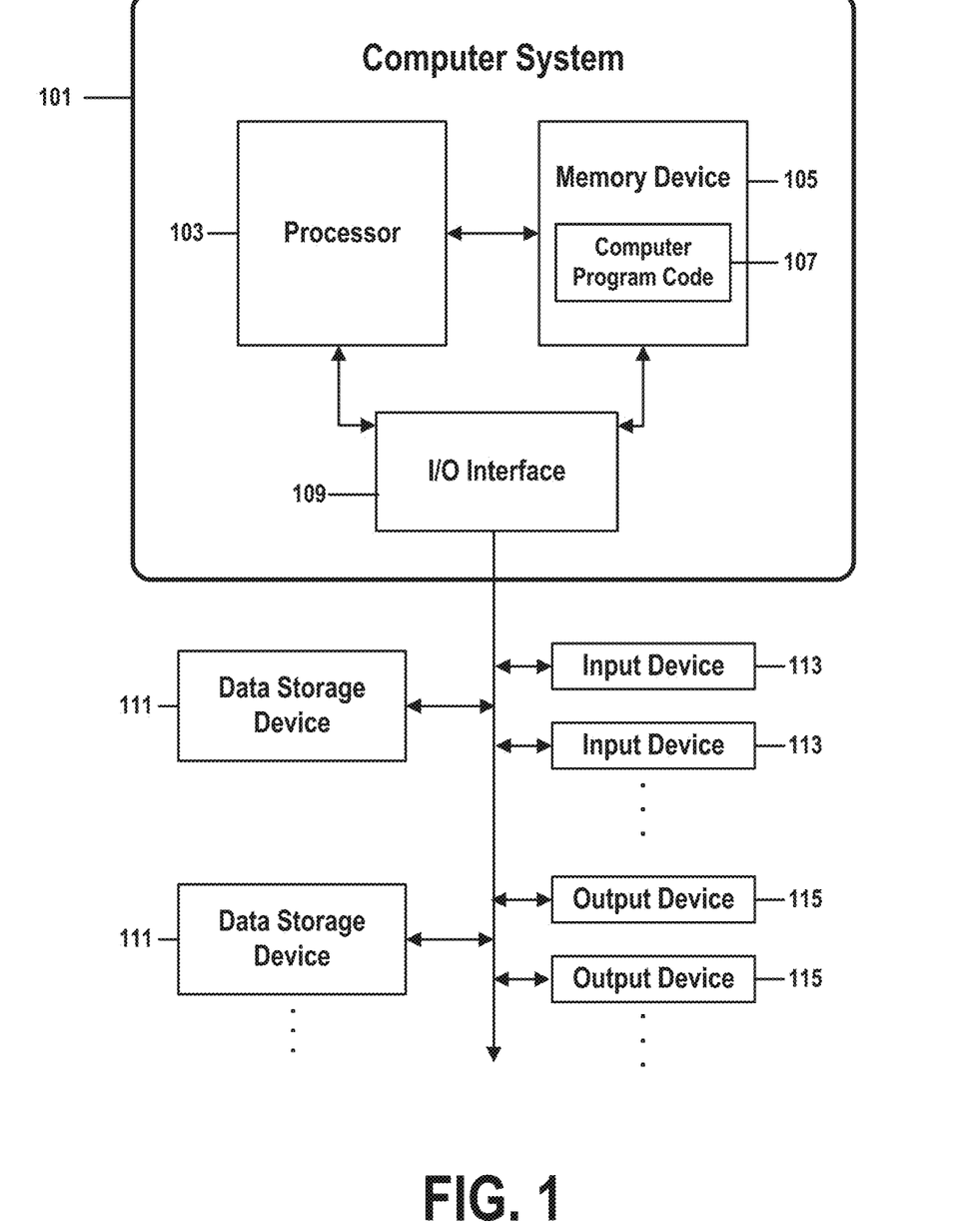
FIG. 1 shows a structure of a computer system and computer program code that may be used to implement a method for multi-step authentication using objective and subjective credentials in accordance with embodiments of the present invention.

FIG. 1 shows a structure of a computer system and computer program code that may be used to implement a method for multi-step authentication using objective and subjective credential sin accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for multi-step authentication using objective and subjective credentials in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for multi-step authentication using objective and subjective credentials.

Any of the components of the present invention could be created, integrated, hosted, maintained, deployed, managed, serviced, supported, etc. by a service provider who offers to facilitate a method for multi-step authentication using objective and subjective credentials. Thus the present invention discloses a process for deploying or integrating computing infrastructure, comprising integrating computer-readable code into the computer system 101, wherein the code in combination with the computer system 101 is capable of performing a method for multi-step authentication using objective and subjective credentials.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for multi-step authentication using objective and subjective credentials may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for multi-step authentication using objective and subjective credentials is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
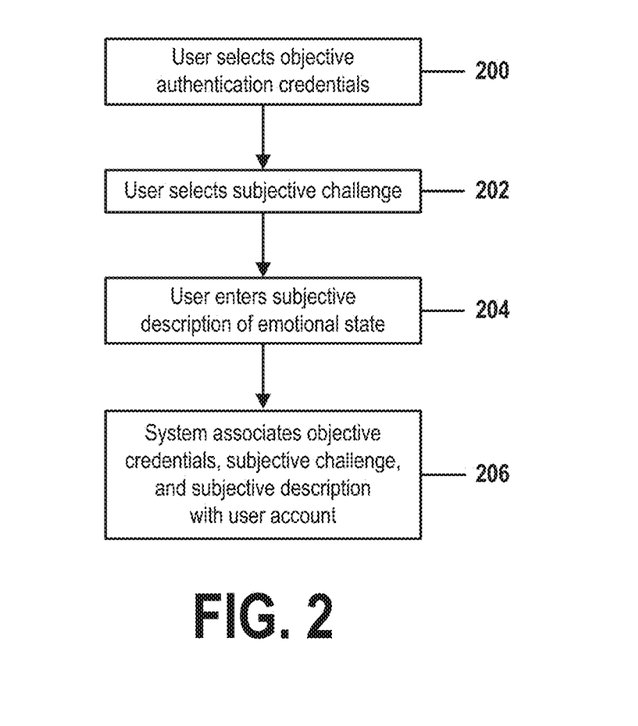
FIG. 2 is a flow chart that illustrates steps of a procedure for allowing a user to identify objective and subjective log-in credentials in accordance with embodiments of the present invention.

FIG. 2 is a flow chart that illustrates steps of a procedure for allowing a user to identify objective and subjective log-in credentials in accordance with embodiments of the present invention. FIG. 2 contains steps 200-206.

In step 200, a software user begins setting up log-in credentials capable of providing the user access to a software system by submitting, in response to a request from a security component of the software system, objective authentication credentials. The user of the software system may be operating on a computer system, a client device of a client-server architecture, a smartphone, a tablet, a laptop, another type of portable device, an integrated special-purpose system like a standalone music-production workstation, a virtual infrastructure component, or any other physical or virtual device capable of setting up or performing a log-in procedure of a secured software system.

In embodiments that comprise components of a distributed platform, a cloud-computing environment, or a client-server architecture, functionality of the present invention may be implemented solely on a client or user device, may be implemented solely on a remote server or as a service of a cloud-computing platform, or may be split between local and remote components.

Any type of objective authentication credentials may be entered in this step, such as a password, a passphrase, biometric input, a musical passage, or a gesture, such that an associated user log-in procedure requires matching the user's subsequently entered objective log-in credentials with stored information that represents the objective credentials entered in step 200. In some embodiments, credentials may be case sensitive. Entry made either during the subsequent log-in procedure or during step 200 may be performed by any means known in the art, such as through a typewriter-style keyboard, a touchscreen, a fingerprint reader, a MIDI controller, or a retinal scanner. In some embodiments, entry may be performed by selecting a textual or non-textual item, such as from a list displayed by the security component.

In step 202, the user sets up a subjective authentication step of the multi-step authentication procedure, where the additional step is based on responding to a subjective challenge in order to generate subjective authentication credentials.

In this step, the system allows the user to select a subjective challenge. When the user later requests to log onto the software system (as in the method of FIG. 4), the system will present to the user either the subjective challenge selected in step 202 or a different subjective challenge that has been associated with the selected subjective challenge by means of the method of FIG. 3. The system will then authenticate the user only if receiving a subjective response from the user that is consistent with the subjective response entered by the same user in step 204. Unlike an objective authentication procedure, the response entered during the log-in procedure of FIG. 4 does not need to match objective information stored during step 202 that represents the subjective challenge.

Any sort of subjective challenge may be presented to the user or selected by the user in this step, so long as the subjective challenge is capable of eliciting subjective responses from the user. For example, the system may present to the user, or allow the user to select, one or more previously recorded audio or MIDI musical passages, may allow the user to select or upload one or more displayed photographs, animations, or video clips, or may allow the user to select a subjective challenge by singing a melody or playing a musical passage on a MIDI controller.

The subjective challenge may comprise objective content, such as musical recordings visual content, or text. For example, the challenge may comprise a political cartoon, a company logo, a news headline, or an audio recording of human speech.

Some embodiments may allow a user to enter a challenge of the user's own choosing. For example, a user may be allowed to play a musical passage of the user's own choosing on a MIDI keyboard or other type of computerized musical-instrument controller, to upload or identify a video clip or still image of the user's choosing or to submit a clip or image by means of an attached camera, or to enter an audio recording of the user singing or speaking content of the user's own choosing through an attached microphone.

Figure 3:
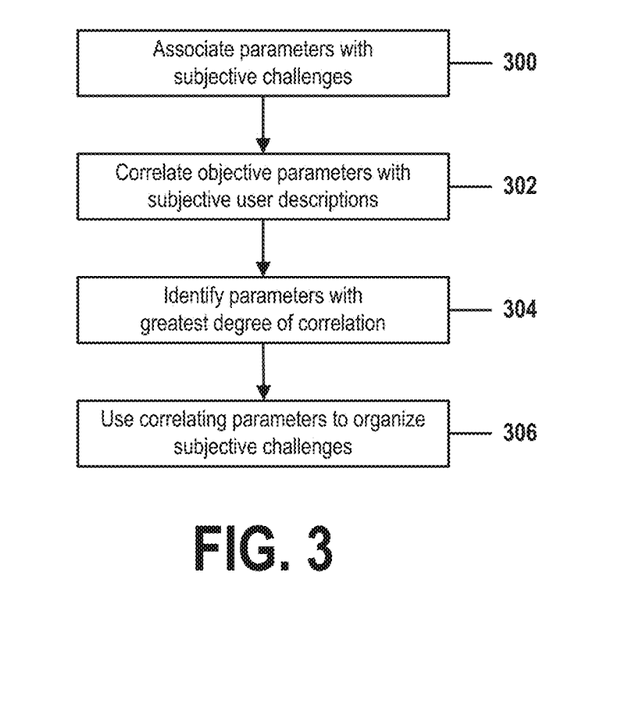
FIG. 3 is a flow chart that illustrates steps of a procedure for correlating subjective log-in challenges with user sentiments in accordance with embodiments of the present invention.

In some cases, the system may be able to infer objective characteristics of a user-generated subjective challenge, such as a semantic meaning of an image, in order to facilitate correlation steps of FIG. 3. For example, when entering a musical passage, the user may be asked to manually designate a key signature, genre, title, or composer of the passage. The system may also help a user more accurately enter manually generated challenges with aids like a metronome "click" or scrolling karaoke-style song lyrics.

In step 204, the system allows the user to associate each of the subjective challenges entered or selected in step 202 with a subjective response that is specific to the user. When the user later requests to log onto the software system (as by means of the method of FIG. 4), the system will present to the user the subjective challenges selected or entered in step 202 (or different subjective challenged that may be correlated to the selected subjective challenges by means of the method of FIG. 3). The system will then request from the user a subjective response for each subjective challenge that is determined to be consistent with the corresponding subjective response previously entered by the same user in step 202. In some embodiments, subjective responses may be case sensitive.

Therefore, the system may in step 204 display a combination of one or more photographs, animations, or video clips to the user, selected either by the system or by the user, and solicit a response from the user that describes one or more of the user's perception of the emotional content of the displayed content, or that describes one or more of the user's emotional reactions of to the content.

For example, if the user in step 202 selected a recording of, played on a computerized piano-like keyboard, a musical excerpt from a performance of the opera "Carmen," the system in step 204 may ask the user to enter or select one or more one-word or natural-language descriptions of the mood elicited in the user by the excerpt. In response, the user might describe three moods (or select three moods from a list) that were experienced by the user when listening to the excerpt: "happy," "excited," and "physically energized." In some embodiments, the user might also specify a relative intensity of each mood.

In another example, if the user in step 202 selected or uploaded a photograph of a mountain vista, the system in step 204 might allow the user to enter or select four subjective, natural-language descriptions of moods or sentiments experienced by the user when viewing the photograph. In this case, one user might respond with the descriptions "peaceful," "humbled by the vastness of nature," "inspired," and "nostalgic for country living," while a second user might respond with "Worried about the Environment," "I feel an affinity with wildlife," "nostalgic," and "sad." Some embodiments might interpret such descriptions as case-sensitive text.

Implementers may, subject to certain requirements, constrain a user's subjective responses in step 204. As explained in the description of FIG. 3, the responses must allow the system to infer and correlate the user's subjective emotional response with objective characteristics of the subjective challenge. The system must also be capable of correlating the user's subjective responses with objective characteristics of the subjective challenge by means of the methods of FIGS. 3 and 4. In some embodiments, this may use known methods of natural-language processing, text analytics, or semantic analytics to infer meaningful sentiment from the user's subjective responses.

The subjective challenge: may contain objective content, such as textual content and the aforementioned musical recordings and displayed visual content. For example, challenges may comprise a political cartoon, a company logo, and a recording of human speech.

In embodiments that comprise more than two steps of authentication, steps 200-204 may be repeated in any combination.

At the conclusion of step 204, the user will have entered or selected at least one set of objective authentication credentials, such as a password, a photograph, or an audio recording, at least one subjective authentication challenge, such as an audio/video recording or a graphical image, and at least one subjective response to each of the subjective challenges, where each subjective response represents the user's subjective reaction to a corresponding subjective challenge.

In step 206, the system associates the user's account with the objective d subjective challenges identified in steps 200-202 and with the subjective user responses identified in step 204. These associations may be performed by any means known in the art, such as by storing the challenges and responses into tables of a relational database. Embodiments may be made more secure by encrypting this stored information, by storing it across multiple, distinct, storage repositories, by transferring the stored data between the system and the storage repositories through different channels (such as by transferring a password through an enterprise network connected to the system and by transferring a musical recording through a cellular network connected to a handheld device), or through any other means known in the art.

FIG. 3 is a flow chart that illustrates steps of a procedure for correlating subjective log-in challenges with user sentiments inferred from subjective user responses entered during step 204 of FIG. 2, FIG. 3 contains steps 300-306.

The method of FIG. 3 assumes the existence of a repository of candidate subjective challenges. In some embodiments, users may select one or more of these challenges from the repository in step 202 and, in other embodiments, user-generated subjective challenges entered by a user in step 202 may be added to the repository. As will be explained below, each stored challenge is associated with a set of parameters that each describe an objective characteristic of the challenge and with a set of subjective characterizations of the challenge aggregated from users' past subjective responses to the challenge.

In step 300, the system, if it has not done so already, associates each candidate subjective challenge with one or more objective parameters. For example, if the system stores a repository of musical recordings capable of being used as subjective challenges during a user log-in procedure, each stored recording may be associated with values a set of objective parameters. In this example, each recording may be associated with a distinct set of values of parameters that identify the recording's relative degree of dynamic-range compression, the recording's beats-per-minute (BPM) tempo, the recording's musical genre, or the name of a musical group, composer, or soloist associated with the recording.

Embodiments of the present invention are flexible enough to accommodate many combinations of such parameters, but methods of FIG. 3 attempt to improve effectiveness of embodiments of the present invention by determining each parameter's relative degree of correlation with subjective user responses to each challenge, like the responses entered in step 204.

In some embodiments, implementers may attempt to initially select a universe of parameters that may be more likely to have higher degrees of correlation. If, for example, a subjective challenge comprises a recording of a musical passage, an implementer might select a parameter that identifies the passage's musical genre or instrumentation, rather than identifying the passage's duration, title, or tonal center.

In more sophisticated implementations, a secondary parameter may be derived as a function of a subset of empirical parameters. For example, a musical passage that may be characterized as comprising a chord progression may be associated with a secondary parameter that identifies subjective characteristics of certain chord progressions. Simple, consonant progressions, such as a I-V-V progression or a I-V-I progression might be arbitrarily associated with lower numeric values of this secondary parameter, progressions that stray farther from a tonal center, such as a I-III-iv-VI or a VI-ii-V progression, might be assigned higher values, more complex progressions comprising chords that contain many non-key notes (such as those used in modern jazz and pop music) would be assigned even higher values, and atonal progressions detached from any particular tonal center might be assigned the highest values. In this example, such a secondary parameter might be interpreted as a measure of a musical passage's tonality.

Objective parameters may be similarly associated with other types of content comprised by a subjective challenge. Photographic images, for example, could be characterized by values of parameters that identify each image's resolution, color depth, average density, range of light, or average color saturation. A video clip might be associated with two sets of parameters that each either characterize the visual content of the clip or that characterize the audio content of the clip.

Parametric values may be associated with each subjective challenge by any means known in the art. If, for example, a challenge is stored in or identified by a repository database record, other fields, records, or tables of the same, or a different, database may associate values with that challenge.

In other cases, if subjective challenges are each stored in a folder of the repository as a multimedia file, each challenge's associated values may be stored as metadata of that challenge's corresponding file. For example, parametric values associated with an MP3-format audio file might be embedded into that file as ID3 fields.

In step 302, the system attempts to correlate subjective characterizations of the subjective challenges with each objective parameter identified in step 300. This correlation may be performed by any means known in the art, including statistical analyses that identify which objective parameters are the most accurate predictors of certain user-submitted subjective descriptions.

In a simple example, users are allowed to characterize a challenge image as making the users feel either "peaceful" or "uneasy." Here, the system ay in step 302 determine that a relatively large number of "peaceful" images are associated with a certain average color value and a relatively large proportion of "uneasy" images are associated with a different average color value. The system would thus determine that the average color-value parameter has a statistically significant degree of correlation with subjective user "mood" or "sentiment." Moreover, if both "peaceful" and "uneasy" images are associated with similar distributions of values of an image-resolution parameter, the system would further determine that the average color-value parameter has a greater degree of correlation with subjective user sentiment than does the image-resolution parameter.

Similar methods may be used to correlate parameters with user sentiment when an embodiment is capable of identifying a larger range of user moods. In some embodiments, natural-language processing, analytics, artificial intelligence, or other known technologies may be used in step 204 or 206 of FIG. 2 in order to infer a user's mood or sentiment from natural-language descriptions entered by the user.

In certain embodiments, an inferred user mood or sentiment may be associated with one or more of a predefined set of categories. In other embodiments, objective parameters may be correlated with an ordered set user-submitted subjective responses. For example, a system may ask a user to enter three "moods" invoked in the user by a piece of recorded music, in decreasing order of importance. In this example, each recording of the set of all musical-recording challenges may be associated with values of parameters. The system may then in step 302 attempt to correlate each of the ten objective parameters with a set of triplets, where each triplet consists of the three moods entered by users in response to hearing one particular challenge recording. If, for example, recordings made with higher levels of dynamic-range compression are more likely to be associated with triplets that identify the mood "aggressive" or those that specify the mood "aggressive" as a first (highest-priority) element of an ordered triplet, then the system would determine a higher degree of correlation between the dynamic-range compression parameter and a user's subjective mood.

More sophisticated methods known in the art may be used to more precisely identify degrees of correlation, such as a multinomial logistic regression analysis or a linear regression analysis. The present invention is flexible enough to accommodate embodiments comprising any sort of correlation-identification mechanism desired by an implementer.

In step 304, the system selects a subset of the objective parameters that have been identified in step 302 as having a greatest degree of correlation with user-entered subjective characterizations of the stored subjective challenges.

This selection may be made by any means preferred by an implementer. For example, the system may select a subset consisting of the ten parameters that have the greatest degree of correlation, or may select all parameters that correlate within a 70% confidence factor.

At the conclusion of step 304, the system will have associated each subjective challenge in the repository with values of those objective parameters that have a relatively high degree of correlation with user mood. If, for example, user-reported moods generated by musical recordings correlate most closely with the parameters "BPM," "genre," and "year of composition," then those three parameters will be used to organize the set of stored musical recordings in step 306. Recordings associated with more similar values of the three parameters will thus be determined to be more likely to invoke similar moods or sentiments in users.

In step 306, the system organizes the set of subjective challenges as a function of the most highly correlating parameters identified in step 304. This organization will allow the system, during the method of FIG. 4, to identify challenges that are most likely to evoke a mood similar to that evoked by a user's initial subjective challenge identified by that user in step 202.

In some embodiments, selected parameters may be weighted such that those with the a higher degree of correlation are given greater weight when determining which objective parameters correlate most closely with user-described subjective characterizations.

In other embodiments, subjective challenges may be organized as a function of correlations between objective-parameter values and specific values of subjective user responses. For example, if two particular parameters correlate most closely with challenges that users describe in a positive way, but three other parameters correlate most closely with challenges that users described in negative terms, then challenges described most often as "vibrant" might be grouped as a function of the two particular parameters, and challenges described most often as "ominous" might be grouped as a function of the three other parameters.

Figure 4:
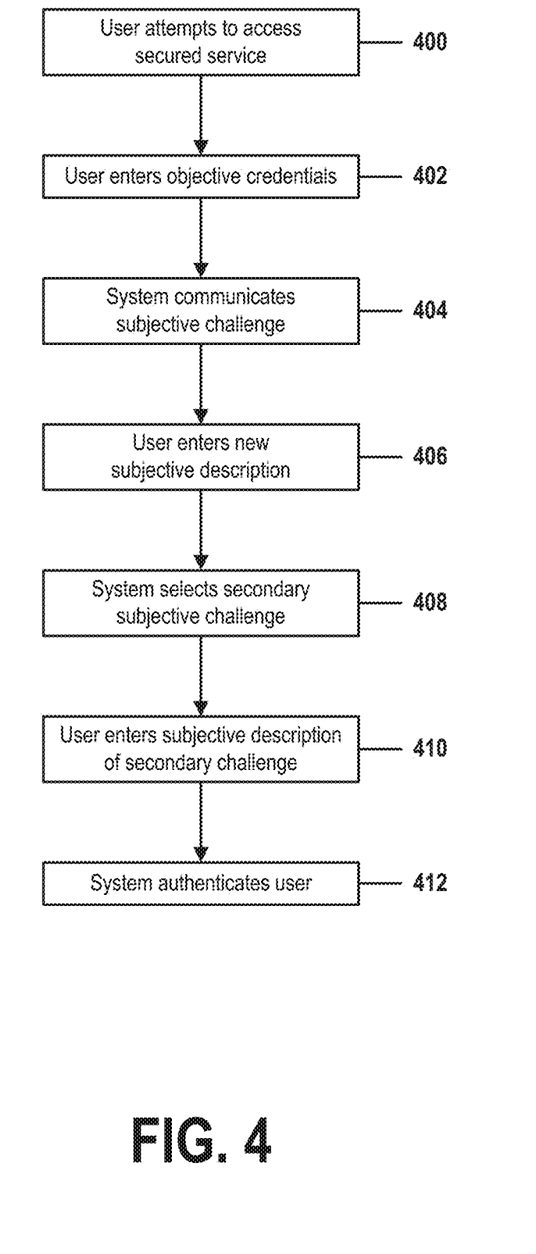
FIG. 4 is a flow chart that illustrates steps of a method for multi-step user authentication comprising both objective and subjective authentication steps in accordance with embodiments of the present invention.

FIG. 4 is a flow chart that illustrates steps of a method for multi-step user authentication comprising both objective and subjective authentication steps in accordance with embodiments of the present invention. FIG. 4 contains steps 400-412.

In step 400, the user notifies the secured software system that the user wishes to log onto the secured software system using the objective and subjective credentials previously set up by performing the method of FIG. 2.

In step 402, the user responds to a system request for the objective credentials by entering the objective credentials previously identified by the same user in step 200 of FIG. 2. In some embodiments, objective credentials may be case sensitive. In embodiments that comprise multiple sets of objective credentials, the system may in this step present other types of objective challenges, such as a request for a user to identify a photograph that had previously been selected by the user.

If the user responds in step 402 by entering a correct set of objective credentials, the method of FIG. 4 proceeds to step 404. If the user does not respond correctly, the system may again request the same objective credentials, may request a different set of objective credentials that are associated with the user, may offer the user a chance to recover or reset the requested credentials through an out-of-band channel, may bar the user from accessing the software system, may alert an administrator or other monitoring entity of a security breach, or may perform any other sort of response to a failed authentication request that is known in the art.

In step 404, if the user has correctly entered the requested objective credentials in step 402, the system may begin a subjective-authentication phase of the multi-step authentication procedure by presenting to the user the one or more subjective challenges identified in step 202 of FIG. 2.

In step 406, the user responds to the subjective challenge of step 404 by entering one or more subjective responses. The system responds to this entry by determining that the entered subjective responses may be interpreted as characterizing the user's mood or sentiment in a manner that is consistent with the user sentiment characterized by the user's previous responses to the subjective challenges in step 204 of FIG. 2

In one example, the user in step 202 may have selected a certain musical recording as a subjective challenge and in step 204 entered two subjective characterizations of how the recording made the user feel: primarily "happy" and secondarily "vibrant." In step 406, the system would then play the same recording and ask the user to respond with two characterizations of how the recording made the user feel during this second playing.

In some embodiments, the system might require the user to respond with the same two subjective characterizations in the same order or might require characterizations to be entered with case-sensitivity. In other embodiments, the system might require the user to respond with the same two subjective characterizations in any order. In yet other embodiments, the system might use techniques of natural-language processing, text analytics, semantic analytics, sentiment analysis, or artificial intelligence to determine whether a first sentiment inferred from the user's first set of characterizations, entered in step 202, are similar within a desired confidence level, to a second sentiment inferred from the user's second set of characterizations, entered in step 406. In such a case a second set consisting of the ordered pair "joyous" and "excited" might be construed to imply a mood sufficiently consistent with the mood inferred from the first set. But a second set consisting of the ordered pair "relaxed" and "peaceful but a little bored" might be construed to imply a mood that is inconsistent with the user's earlier mood, and thus result in the user being denied access to the secured system.

The present invention is flexible enough to allow such embodiments to accommodate any known means desired by an implementer of determining such similarities, and to accommodate any known means desired by an implementer of setting such a confidence level, including arbitrary choices, choices made as a function of expert knowledge of the implementer, choices made as a function of business priorities or technical constraints, or choices made as a function of historic performance data.

In the current example, requiring greater similarity between the first inferred sentiment and the second inferred sentiment would make the system re secure, but would increase the risk that a legitimate user may be denied access to the system. In some cases, an optimal degree of similarity may be determined empirically, by testing an implementation with real-world users.

Some embodiments may attempt to mitigate the potential indeterminateness of subjective authentication by allowing a user in step 404 or 406 to interactively reset subjective credentials previously established in steps 202-206. In some cases, the user may be allowed to do so only if the user is first able to correctly enter one or more objective authentication credentials, or if the user's two sets of entered subjective criteria match a less-stringent requirement for similarity.

In step 408, the system may select a secondary subjective challenge that is distinct from the first subjective challenge that was initially selected by the user in step 202. The system may select this second challenge as a function of the organizing steps of the method of FIG. 3. The intent of this step is to select a second element by means of parameters that have a relatively high degree of correlation with the user's subjective emotional response to the first challenge, as identified in step 304 of FIG. 3.

For example, if the user had selected a photographic image in step 202 that the user characterized in step 204 as making the user feel "surprised," "intrigued," and "intellectually stimulated," the system might in step 408 attempt to select a second image that is capable of eliciting the same or similar characterizations from the same user or that is capable of eliciting from the same user a set of subjective characterizations from which may be inferred a sentiment that is the same or similar to a user sentiment inferred from the characterizations entered in step 204.

As described in FIG. 3, this selection might be made by comparing values of certain parameters associated with each candidate image, where those certain parameters are determined in step 304 as having a high degree of correlation with the mood or sentiment experienced by a user in response to a subjective challenge. If, for example, the system had in step 304 determined that a subjective user characterizations of an image are highly correlated with image resolution, average density, and range of light, then the system might in step 408 select a challenge image for a particular user that has resolution, average density, and range of light similar to that of the image identified in step 202 as that same user's initial subjective challenge.

In some embodiments, moods and sentiments may be assigned numeric values, or tuplets of numeric values, based on an interpretation of each mood's relative strength in a particular dimension. For example, along an axis of positive/negative emotions, the mood "ecstatic" might be assigned a value of 1.0, "joyous" 0.8, "happy" 0.7, "satisfied" 0.5, "unhappy" 0.4, "miserable" 0.2, and "depressed" 0.1. Such numeric ranking may be used to quantitatively compare moods and sentiments, allowing a pair of moods and sentiments to be deemed "similar" or "dissimilar" as a function of the difference between the pair's numeric values along a single axis, or as a function of the distance between the pair's numeric tuplets in multidimensional space.

Furthermore, in embodiments where the system has assigned weightings to each parameter, the system might in this step proportionally weight the relative importance of each parameter when attempting to select a secondary subjective challenge in step 408.

In step 410, the system presents to the user the secondary subjective challenge selected in step 408, and requests the user to subjectively characterize the secondary subjective challenge or to subjectively describe a mood or sentiment invoked in the user by the secondary subjective challenge. In some embodiments, subjective characterizations entered in this step may be interpreted as being case sensitive. This method of presenting the challenge, requesting a user response, and determining whether the response is consistent with the user's earlier subjective responses is similar to that of steps 404-406.

The system in this step authenticates the user in a manner analogous to that of step 406, by determining whether the user's subjective characterizations of the second element of subjective content are consistent with the user's earlier subjective characterizations of the first element of subjective content selected in step 202. This step is qualitatively different than known methods of determining whether an entered set of objective credentials match a stored copy of the same credentials. While known methods of objective authentication require a user to correctly match stored data items, embodiments of the present invention determine whether a user's subjective reactions to a new challenge are the type of reactions that would have been expected from the user that had previously entered subjective characterizations in step 204. The user does not, in this subjective-authentication step, need to match any stored data.

Embodiments of the present invention may use any of the previously described methods, or any other methods known in the art, to present the second subjective challenge to the user; to request a second set of one or more user characterizations of the second subjective challenge; to infer sentiment from the user's second set of one or more characterizations; to compare the user's first set of characterizations (submitted in step 204) to the second set of characterizations or to compare the mood or sentiment inferred from the first set of characterizations to the mood or sentiment inferred from the second set of characterizations; and to determine whether the two sets of characterizations or the sentiments are sufficiently "similar" to authenticate the user.

In step 412, the system determines whether the user's second set of characterizations entered in step 410, are consist with the user's earlier characterizations entered in step 204. If the system determines that the two are consistent, then the system deems the user to have been authenticated and grants the user access to the secured software system.

Embodiments of the present invention may comprise a combination of more than one objective challenges, such as that of step 402, and more than one subjective challenge, such as the challenges of steps 404-406 and 408-410. In some embodiments, the system may not present the user with the same subjective challenge that the user selected in step 202, thus skipping steps 404 and 406. In other embodiments, the system may not challenge the user with subjective challenges distinct from the subjective challenge that the user selected in step 202, thus omitting steps 408-410.

In other words, the present invention is flexible enough to accommodate any combination of one or more objective challenges with one or more subjective challenges, where the one or more subjective challenges may comprise a combination of a subjective challenge initially selected in step 202 and other subjective challenges chosen by the system step 408 as a function of the method of FIG. 3. Embodiments may thus omit steps 404-406 or steps 408-410, or may perform steps 408-410 multiple times, as desired by an implementer.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
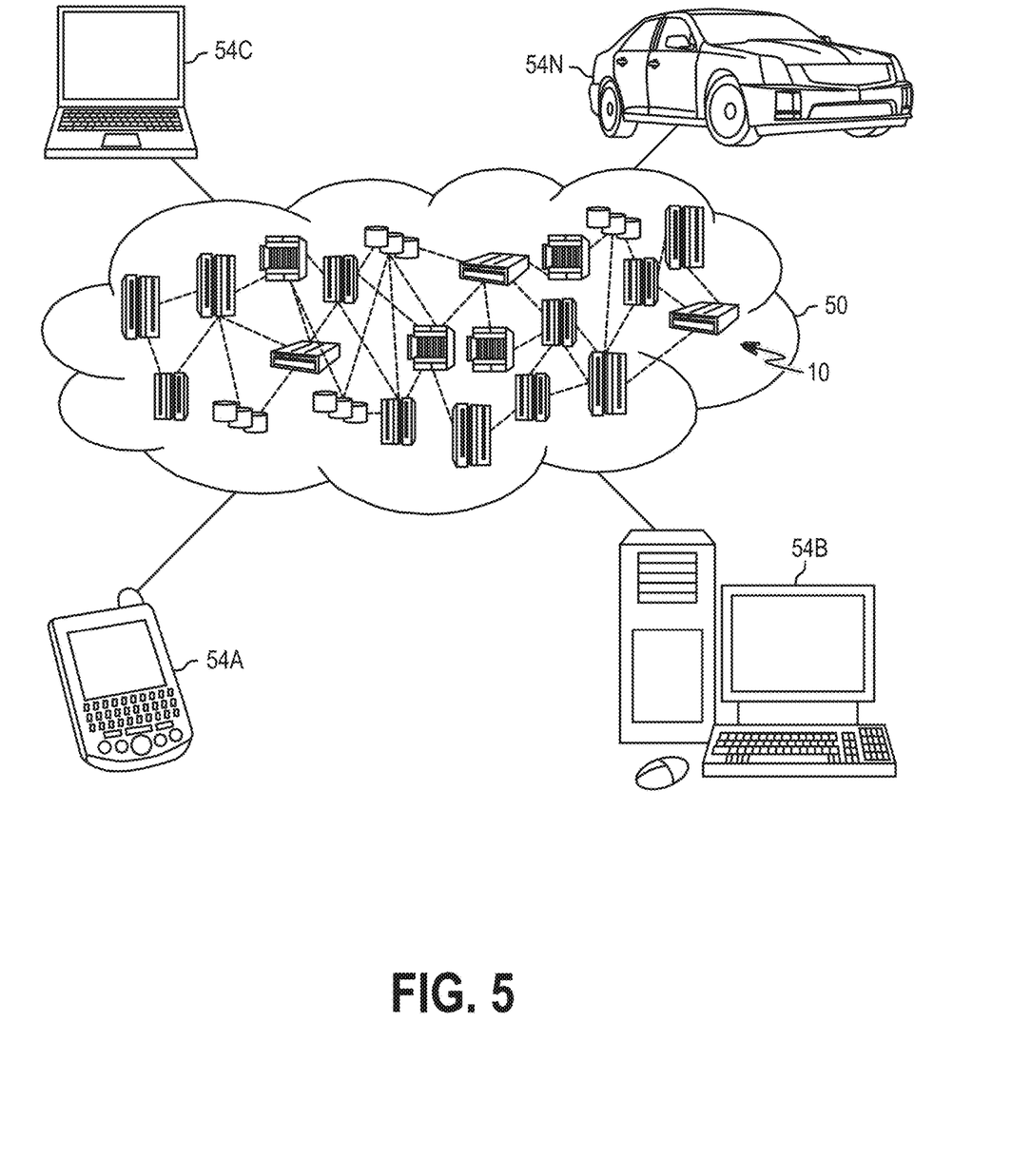
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
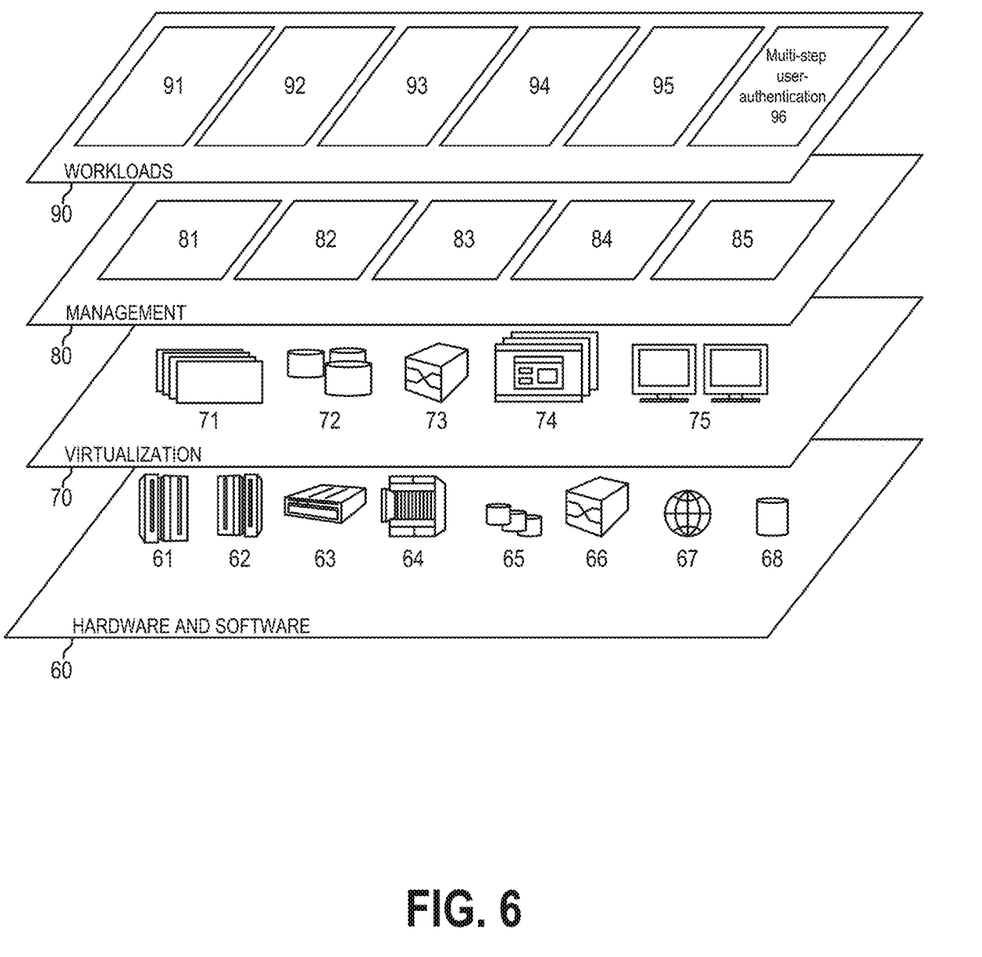
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced. Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-step user authentication using objective and subjective credentials 96.

Examples and embodiments of the present invention described in this document have been presented for illustrative purposes. They should not be construed to be exhaustive nor limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A method for multi-step authentication using objective and subjective credentials,
the method comprising a setting-up procedure and an authentication procedure,
where the setting-up procedure comprises:
receiving from a user, by a user-authentication system, a selection of an objective log-in credential;
recognizing, by the user authentication system,
an identification by the user of a first subjective challenge; and
further receiving from the user, by the user-authentication system, a first subjective description of an emotional response of the user to the first subjective challenge, where the first subjective description consists of a natural-language description entered by the user in response to an interactive request for such a response made by the user-authentication system; and
where the authentication procedure comprises:
identifying, by the user-authentication system, a request from the user to log onto a secured system;
accepting from the user, by the user-authentication system, the objective log-in credential;
communicating to the user, by the user-authentication system, a second subjective challenge that is different from the first subjective challenge, where the second subjective challenge is correlated with the first subjective challenge;
further accepting from the user, by the user-authentication system, a second subjective description of a user's emotional response to the second subjective challenge;
confirming, by the user authentication system, that the second subjective description is consistent with the first subjective description and,
where the confirming comprises inferring, by the user-authentication system, that the first subjective challenge and the first subjective description share identical objective characteristics with the second subjective challenge and the second subjective description; and
where the first subjective description is associated with the first subjective challenge and the second subjective description is associated with the second subjective challenge; and
granting the user, by the user-authentication system, access to the secured system in response to the confirming.

2. The method of claim 1, where the second subjective challenge is not distinct from the first subjective challenge.

3. The method of claim 1,
where the first subjective description enumerates a first plurality of emotional states induced in the user by the first subjective challenge,
where the second subjective description enumerates a second plurality of emotional states induced in the user by the second subjective challenge, and
where the confirming further comprises:
the user-authentication system inferring a first user sentiment from the first plurality of emotional states,
the user-authentication system inferring a second user sentiment from the second plurality of emotional states, and
the user-authentication system determining that the first user sentiment matches the second user sentiment.

4. The method of claim 1,
where the objective log-in credential is a password, and
where the first subjective challenge and the second subjective challenge each comprise at least one item selected from a group consisting of: a live musical performance, an audio recording, a photograph, an animation, a graphical image, text, and a video clip.

5. The method of claim 1, further comprising:
the user-authentication system selecting the second subjective challenge from a set of candidate subjective challenges, where each subjective challenge of the set of candidate subjective challenges is associated with corresponding values of a set of parameters of the objective characteristics and with a set of subjective user descriptions, the selecting comprising:
the user-authentication system identifying a subset of the set of parameters that correlate with the subjective user descriptions; and
the user-authentication system selecting the second subjective challenge from a subset of the set of candidate subjective challenges, where each subjective challenge of the subset of the set of candidate subjective challenges is associated with values of the subset of parameters that match values of corresponding parameters associated with the first subjective challenge.

6. The method of claim 1, further comprising providing at least one support service for at least one of creating, integrating, hosting, maintaining, and deploying computer-readable program code in the user-authentication system, wherein the computer-readable program code in combination with the the user-authentication system is configured to implement the receiving, the recognizing, the further receiving, the identifying, the accepting, the communicating, the further accepting, the confirming and the granting.

* * * * *